Sept. 3, 1957     H. G. BRILMYER     2,804,798
LOCKBOLT CONSTRUCTION
Filed May 5, 1954
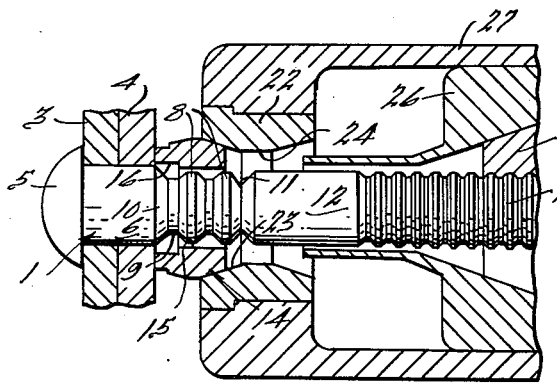
Fig. 1.
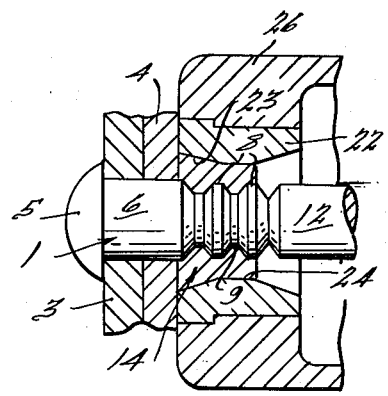
Fig. 2.
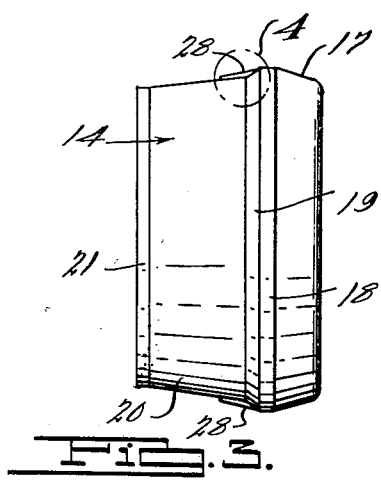
Fig. 3.
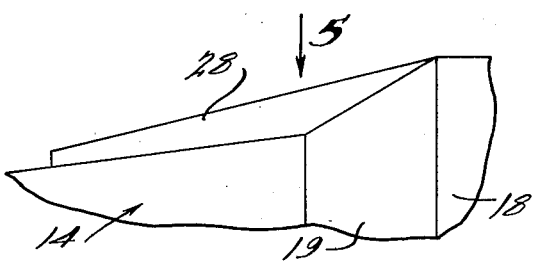
Fig. 4.
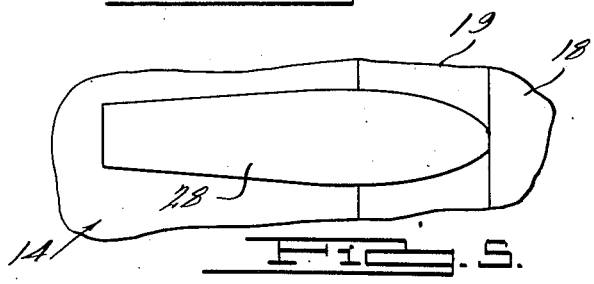
Fig. 5.
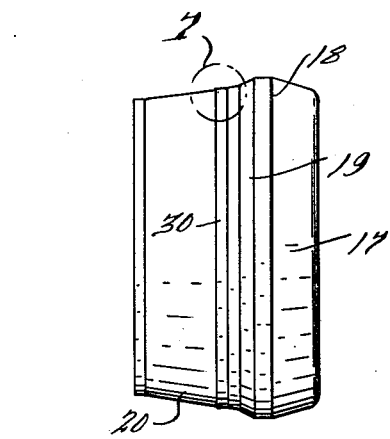
Fig. 6.
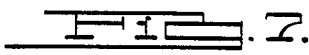
Fig. 7.
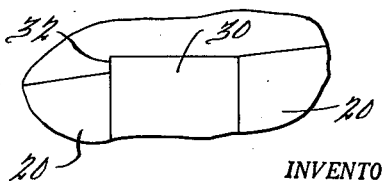
INVENTOR.
Harold G. Brilmyer
BY
Barness, Dickey & Pierce
ATTORNEYS

2,804,798

LOCKBOLT CONSTRUCTION

Harold G. Brilmyer, Grosse Pointe, Mich., assignor to Huck Manufacturing Company, a corporation of Michigan Application May 5, 1954, Serial No. 427,719

1 Claim. (Cl. 85—5)

The present invention relates to improvements in fastening devices and particularly to improvements in fastening devices known as lockbolts of the type disclosed in Huck Patent No. 2,531,048, Huck Patent No. 2,531,049 and copending application of Roy C. Scheuring, Serial No. 378,897, filed September 8, 1953.

In general, the present invention comprises a two-part fastener particularly adapted for use where the applied shear loads on the fastener are of primary significance while the tensile loads on the fastener are of secondary or relatively unimportant significance. Fasteners of this type are used to a considerable extent in the aircraft industry where the requirements with respect to weight and strength are of particular significance. However, the fasteners have utility in many other applications.

The two-part fastener of the present invention includes a pin or bolt having a preformed head adapted to be inserted from one side of the work, and a collar adapted to be inserted over the pin at the opposite side of the work and thereafter swaged or clinched to the pin. The work usually comprises, for example, a plurality of plate or panel members having aligned openings therein through which the pin extends. The head engages the outside surface of one of the panel members and the collar engages the outside surface of the other panel member. The fastener is set by pulling the pin and applying the reaction force to the collar, as in the Huck patents above referred to. After a certain pulling force is reached, the collar is locked to the pin by flowing metal into the locking grooves in the pin and, when properly set, substantially the entire length of the collar is swedged into the locking grooves. During the initial or primary clinching operation, the plates are pulled tightly together. An interference fit plus bringing the sheets into intimate contact is accomplished by the primary clinch, that is, before motion of the anvil has caused sufficient swaging of the collar to bring the inside diameter of the collar into engagement with the locking lands which define the locking grooves of the pin.

The collar of the present invention is illustrated here with its peripheral surface formed with a pair of oppositely directed frusto-conical portions, as disclosed in the copending Scheuring application above referred to. The frusto-conical portion at one end of the collar matches the swaging anvil and permits high hold-off so that the pin will pull the sheets together and hole-fill as in the Huck patents above referred to. The remaining or opposite frusto-conical surface permits the collar to swage completely even though the grip length of the fastener varies. By "grip length" is meant the combined wall thickness of the plates that are secured together by the fastener. Within minimum and maximum grip lengths for the particular fastener the shank of the pin also protrudes so that the fastener has full bearing and effects maximum shear strength. In order to accommodate the fastener for minimum grip, the collar is formed with an internal counterbore in the end of the collar adjacent the head of the pin so that for such minimum grip the shank of the pin may protrude slightly into the collar without interference.

According to the present invention, the collar is provided with a projecting portion or portions on the peripheral surface away from that frusto-conical portion which is engaged by the swaging anvil. Such projecting portion is of such configuration and location that when the lockbolt has been properly set the projection will have merged into the body of the swedged collar and the peripheral surface of the collar will be smooth therearound. If the lockbolt has not been properly set and the collar swedged through substantially its entire length, then the projection will still be apparent on the peripheral surface of the collar. Thus the present invention provides for ready visual inspection of the set lockbolts and relieves the inspection of the fastenings by the slower inspection devices now in use.

One of the primary objects of the present invention is to simplify the inspection of set fasteners of the type mentioned.

Another object of the invention is to provide for simplified visual inspection of set fasteners of the type mentioned.

Other objects of the invention will become apparent from the following specification, the drawing relating thereto and from the claims hereinafter set forth.

In the drawing in which like numbers are used to designate like parts in the several views throughout:

Figure 1 is a cross-sectional view illustrating a fastener assembly showing the fastener in an intermediate setting operation, before the collar has been swedged to the pin;

Fig. 2 is a view similar to Fig. 1 illustrating the fastener at the completion of the setting operation but before final breaking of the pin;

Fig. 3 is a side elevational view of a collar embodying features of the present invention;

Fig. 4 is an enlarged partial view taken within the circle 4 of Fig. 3;

Fig. 5 is a top plan view taken in the direction of the arrow 5 in Fig. 4;

Fig. 6 is a view similar to Fig. 3 illustrating a modified form of the present invention;

Fig. 7 is an enlarged view taken within the circle 7 of Fig. 6.

Referring to the drawings, and particularly to Figs. 1–5 thereof, the pin or locking bolt is generally indicated at 1 and is shown as extending through aligned openings 2 in a pair of plates or panels 3 and 4.

The pin 1 has an integral head 5 adapted to engage the adjacent face of panel 3 with the body portion of the pin adapted to pass through and extend beyond the aligned openings 2. The pin 1 also includes a cylindrical hole filling portion 6 adjacent the head 5 and a grooved portion 7 adjacent the cylindrical portion 6. In the pin here illustrated there are only two grooves provided in the grooved portion 7, although the present invention is not so limited. The groove portion 7 comprises a pair of annular ribs 8 with grooves 9 therebetween. The outer diameter of the ribs 8 is less than the outer diameter of the hole filling portion 6; and, between the latter portion and the groove portion 7, the shank has a conical taper or shoulder 10.

It is desirable, but not necessary in all applications, to use the fastener in structural openings smaller than the diameter of the hole filling portion 6, but the openings 2 should be slightly larger than the ribs 8 so that the pin may be easily inserted.

The pin has a breakneck 11 of reduced diameter formed adjacent the end of the grooved portion 7 and this breakneck represents the weakest part of the pin so that the pin will break under tension at this point before it will break under tension at any other point.

The pin has a cylindrical portion 12 next to the breakneck 11 which is of slightly smaller diameter than the ribs 8 and this portion terminates at its outer end in a grooved or gripping portion 13.

The second part of the fastener comprises a novel collar or head generally indicated at 14. The collar 14 is adapted to be received over the end of the pin 1 and is located against the adjacent face of plate 4, as shown in Fig. 1. The collar 14 is adapted to be swaged or contracted radially inwardly into the grooves 9 of the pin so as to lock the collar thereto and form a head against the plate 4 in the completed operation.

Referring to Figs. 1, 3 and 4, the collar is illustrated in its initial form, that is, its form before it is swaged or locked to the pin. The collar is formed with a central opening 15 therethrough which terminates at one end in an enlarged counterbore 16. The peripheral surface of the collar remote from the work in the setting position is formed with a frusto-conical portion 17, and the remaining peripheral surface of the collar is formed with an annular land 18 and an adjacent annular taper 19 which joins with frusto-conical portion 20. The collar terminates in a cylindrical band portion 21.

The opening 15 is slightly larger than the portions 7 and 12 of pin 1, and the counterbore 16 is slightly larger than the cylindrical portion 6 of the pin 1.

The fastener is set my means of riveting mechanism of the type disclosed in Huck Patents No. 2,531,048 and No. 2,531,049, and a portion of such mechanism is shown in Figs. 1 and 2, for purpose of illustration. Such mechanism comprises an anvil 22 having a frusto-conical portion 23 which is substantially complementary to the frusto-conical portion 17 of the collar. At its smaller end the surface 21 joins a short cylindrical bore 24, as in the Huck patents above referred to.

In order to grip the grooved portion 13, gripping jaws 25 are provided which are adapted to be contracted and moved by a body contracting and moving sleeve element 26. When the jaws 25 and the member 26 move to the right so as to pull the pin, the reaction to any pull is applied through a barrel or sleeve 27 and then through the anvil 22 which is mounted in the sleeve 27. After the pin is inserted through the aligned openings in the plates 3 and 4, the collar 14 is placed over the pin and the riveting mechanism is applied over the pin until the grooved end portion 13 is gripped by the jaws 25. Initial operation of the mechanism causes the pin to be pulled and the flared mouth portion 23 of the anvil to move into contact with the conical portion 17 on the collar so as to press against plate 4.

With the collar against plate 4, and the jaws gripping the pin, further pull on the pin will cause the hole filling portion 6 to wire draw down to a smaller diameter, or expand the hole, or a combination of both, as the pin moves into and through openings 2 in the plates, and this continues until the head 5 on the pin bears against the adjacent face of plate 3, as shown in Fig. 2. Under certain conditions it is desirable that the hole filling portion of the pin have an interference fit in the openings, but under other conditions an interference fit may not be necessary or desirable. During the foregoing procedure, the plates are pulled tightly together, if separated.

When the riveting mechanism is actuated to pull the pin and apply the reaction to the collar 14, the surface 23 will tend to move over the tapered or frusto-conical portion 17 of the collar. The extent of early movement of the anvil over the collar depends upon resistance to swaging of the collar, and movement of the anvil over the collar should not exist to any appreciable extent until the completion of interference fit and drawing the sheets together with pressure. At the point when the collar has been swaged into initial contact with the pin, relative free movement between the collar and the pin stops and this is the completion of primary clinch. The purpose of the frusto-conical portion 17 is to provide the desired and sufficient hold-off of swaging as taught in the Huck Patent No. 2,531,048.

After the primary clinch and after the force of the anvil is sufficient to overcome the high initial resistance of the collar 14 to swaging, the anvil moves over surface 17 and causes that end of the collar to swage inwardly into locking engagement with the grooves of the pin.

Completion of the swaging is illustrated in Fig. 2 where the collar has been swaged substantially throughout its length, and a properly swaged collar has the configuration shown in Fig. 2 with the peripheral surface thereof smooth and free of projections.

According to the present invention, the collar 14 is provided with projections 28 thereon of the shape and position illustrated in Figs. 3 to 5. In this embodiment there are two of such projections 28 illustrated at diametrically opposed positions on the periphery of the collar, but it is understood that, in some instances, only one such projection may be employed or, in other instances, more than the two illustrated.

The projection 28 is located in overlying position with respect to the annular tapered portion 19 and the adjacent portion of the frusto-conical portion 20. The projections 28 extend longitudinally of the collar.

The projections 28 include enough metal so that when the collar is driven to its finally set position, as shown at 14, Fig. 2, and when the fastener has been properly set by having the collar 14 swedged into the locking grooves throughout sustantially its entire length, the projections 28 will have merged into the metal of the main body of the collar and will have disappeared in the finally set fastening.

Upon a visual inspection of the peripheral surface of the finally set collar, it can be determined whether the collar has been fully set. In a properly set fastening, the projections or ridges 28 would have disappeared, and the peripheral surface of the collar would be smooth. However, if the collar had not been properly set, there would be portions of the projection 28 remaining on the peripheral surface of the finally set collar, and thus the faulty setting would be readily determined.

In Figs. 6 and 7, a modified form of the present invention is illustrated in which, instead of having the form of projection 28 heretofore illustrated, the projection is in the form of an annular cylindrical ridge 30 formed on the frusto-conical portion 20. In this embodiment the annular cylindrical band 30, which forms the ridge, is spaced slightly from the annular tapered portion 19 of the collar.

Viewing Fig. 7, it will be seen that the band 30 forms an annular projection 32 with respect to the adjacent edge of the frusto-conical portion 20.

The action is similar to that above described in that, with a properly set fastening, the band 30 and the ridge 32 would have merged into the body portion of the collar and disappeared, thus presenting a smooth external surface on the collar. However, if the fastening was not properly set, a portion of the ridge 32 would be visible, thus indicating this fact to the inspector.

Formal changes may be made in the specific embodiments of the invention described without departing from the spirit of the invention, the scope of which is commensurate with the appended claim.

What is claimed is:

A fastener for use in attaching together a plurality of members having aligned openings comprising a pin having a head for engaging the outer side of one member, said pin having a cylindrical portion axially next to the head and adapted to extend through the openings to engage the walls thereof, an externally and circumferentially grooved portion next to the cylindrical portion and adapted to be located substantially at the outer side of the other member, a stem portion at the end opposite the head for enabling gripping and pulling the pin, an annular section weaker than the remaining portion of the pin providing a breakneck between said grooved portion and the stem portion, and a collar disposable on the pin over the stem end in embraceable relation with said pin and adapted to be swedged into the grooves when the fastener is set by pulling the pin, said collar having a central opening therethrough through which said pin is adapted to extend, the peripheral surface of the collar opposite the head terminating in a frusto-conical surface, and the remaining peripheral surface of said collar being substantially smooth therearound, and means forming narrow diametrically opposed and longitudinally extending projections on said remaining peripheral surface, adapted to be swedged into said remaining peripheral surface for indicating that a predetermined swedging force has been applied to said collar.

References Cited in the file of this patent

UNITED STATES PATENTS

| | | |
|---|---|---|
| 2,531,048 | Huck | Nov. 21, 1950 |
| 2,531,049 | Huck | Nov. 21, 1950 |